Dec. 28, 1937.    J. M. PEARSON    2,103,636
ELECTRICAL MEASURING METHOD AND APPARATUS
Filed March 7, 1935
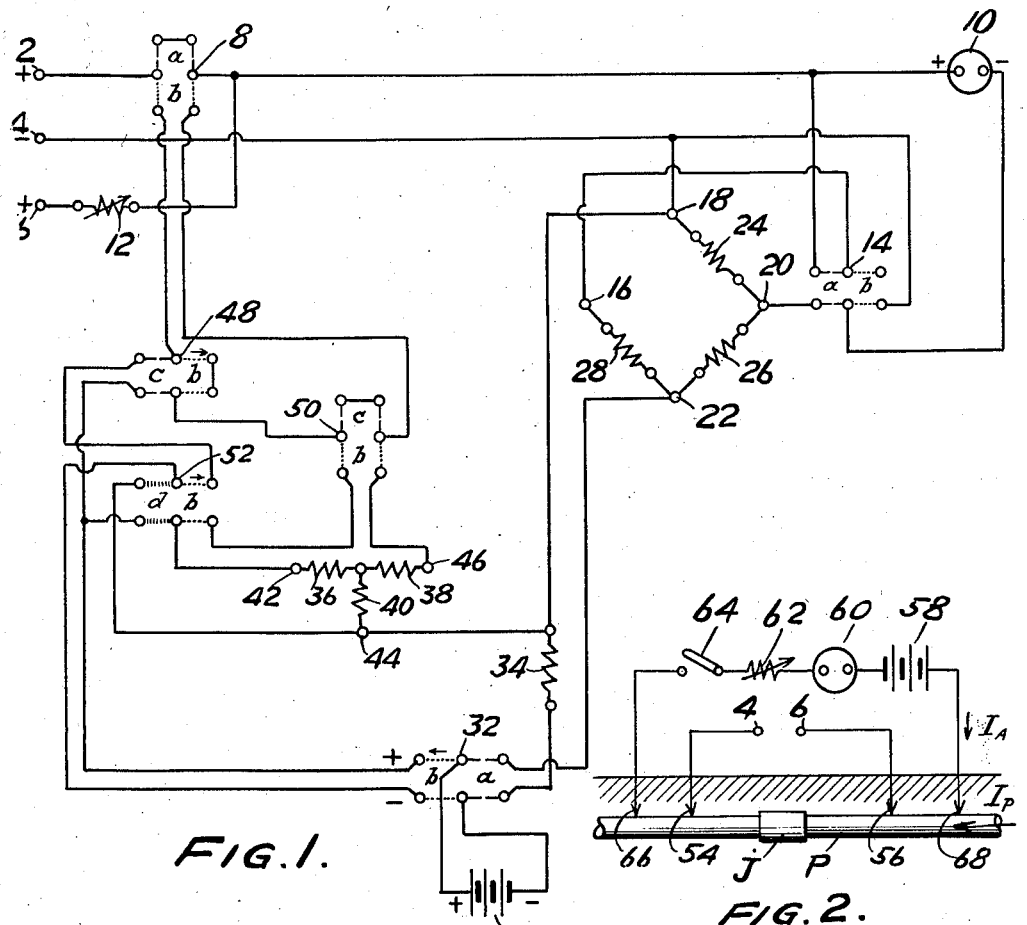
FIG.1.
FIG.2.
FIG.3.
WITNESS:
INVENTOR
John M. Pearson
BY
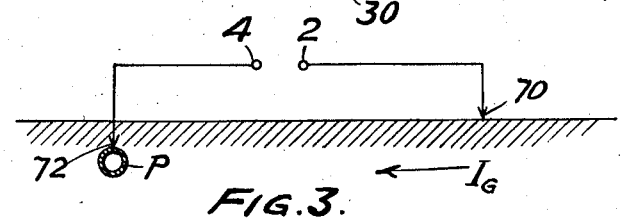
ATTORNEYS.

Patented Dec. 28, 1937

2,103,636

UNITED STATES PATENT OFFICE 2,103,636

ELECTRICAL MEASURING METHOD AND APPARATUS

John M. Pearson, Aldan, Pa., assignor to Sun Oil Company, Philadelphia, Pa., a corporation of New Jersey Application March 7, 1935, Serial No. 9,906

12 Claims. (Cl. 175—183)

This invention relates to an apparatus for the determination of potentials and/or resistances of types which are of interest in connection with the determination of factors bearing upon the electrolysis of underground structures such as pipe lines and which may be interpreted to lead to the avoidance of damaging electrolysis. The invention also relates to a method of procedure whereby the desired useful data may be obtained very readily and with the elimination or minimizing of interfering factors.

Wherever there occur electrical power systems utilizing ground return circuits or metallic return circuits from which leakage of current into the earth takes place, ground currents exist even at very considerable distances from the points where such currents mainly enter and leave the ground. If a metallic conductor of substantial length, such as a pipe line having joints which are conductive to a greater or less degree, depending upon their nature, is located in the ground in the vicinity of such stray ground currents, that conductor will, to a considerable extent, short-circuit such currents due to its better conductivity than the ground, with the result that it may carry currents of considerable magnitude which may enter and leave at various points depending entirely on the configuration of the entire system including such conductor, sources and various portions of the ground itself which may vary substantially in conductivity. Furthermore, the configuration of such electrical system is not constant as, for example, where there exists an electrical railway, the electrical configuration of which varies with the travel of cars. Since electrical railways generally use direct current, they constitute a particularly annoying factor in the matter of electrolysis, since the direct currents are far more destructive than alternating currents. In general, any conductor at a location where it is losing current (namely where it is positive with respect to the surrounding soil) will be rapidly corroded by electrolytic action. When the complete configuration of an electrical system of this type is known, together with its periodic variations, it is possible to avoid the electrolysis, for example, by making suitable electrical connections between the pipe line and sources or between various parts of the disturbing sources.

It is the general object of the present invention to provide a method and apparatus for making potential and/or resistance measurements from which such configuration may be determined. In general, such measurements may be grouped in two classes: first, those made to determine the locations along a pipe line, for example, where it is gaining and losing current and the extent of such gain or loss, and, second, the determination of potentials between the pipe line and various portions of the earth and between various points of the earth at distances from such pipe line.

In connection with the first type of measurement, difficulties are encountered in eliminating unknown and relatively indeterminable factors such as contact resistances and resistances of leads to the instruments. Such factors are particularly disturbing in view of the fact that a pipe line, and particularly a welded pipe line, is an excellent conductor and consequently the voltage drops in relatively short distances are quite small even though the pipe line may be carrying quite heavy currents. Furthermore, because of the necessity for very large numbers of measurements and also because of the necessity for making such measurements rapidly because of fluctuations of the sources with time, it is generally not feasible to use potentiometers, and instead millivoltmeters are desirably used. Millivoltmeters, however, draw current and consequently contact resistances must be taken into account. It may be pointed out that comparative measurements at identical times are desirably made at different points along pipe lines, the observers synchronizing their readings by signals of various sorts. Frequently the potential drop in a line is continuously varying and, of course, under such conditions time cannot be taken to balance a potentiometer.

While attempts have been made to produce known low resistance contacts with pipes, the apparatus necessary requires exposure of a portion of the pipe through a hole of substantial size (the pipes generally being completely buried) and furthermore such arrangements require the use of leads of known resistances to the instruments. It is one object of the present invention to enable the securing of very accurate results even though the only contacts between the pipe line and instruments are made through leads of unknown resistance and by metallic stakes having pointed ends which are driven into the ground and make contact with the pipe, preferably in a glancing fashion so as to dig slightly into the pipe surface. Briefly stated, the invention in the securing of this object involves the adjustment of the complete external circuit of a millivoltmeter to a constant value such as, for example, one ohm. Such circuit includes, for example, the resistance of the pipe between the contact points which, so far as the meter readings are concerned, is generally negligible, at least if welded joints are used, the contact resistances between the stakes and the pipe, and the resistances of the leads.

If the pipe is of welded type and uniform in diameter and thickness, the resistance of any given length can be readily determined, and there is no need for measuring it. On the other hand, if the joints are not welded or if there is such possible deviation from a standard that the resistance of a given length cannot be assumed known, then in accordance with the present invention and besides the use of the arrangement for securing a constant known external resistance, means are provided whereby the resistance of the length of pipe may be determined between points whose difference of potential is being measured.

The invention also contemplates the use of the same apparatus for the determination of potentials between points having substantially high resistances between them. The potentials under such conditions vary greatly, and since the readings of potential should be made to a given percentage of accuracy, it is not generally possible to utilize the same scale of a meter for making all measurements. For example, if a 10 volt scale is used, then readings substantially less than 1 volt will be quite inaccurate and it will be desirable to change to a 1 volt scale. On the other hand, if this is done, using the usual type of multi-range meter, the internal resistance of the meter varies with the scale and consequently comparative results cannot be readily obtained without considerable calculation. Another object of the invention relates to the provision of an apparatus and methods of using the same whereby the input resistance of the meter is constant although its readings are as accurate as those which may be made by the use of various ranges combined with more or less elaborate calculations. This end is attained by providing, between the terminals across which a voltage is imposed and the meter, a network which produces an attenuation such that the voltmeter may be used constantly on a low voltage range either with or without the attenuating network, depending upon circumstances. The design is such, however, that the input resistance of the voltmeter circuit is the same in both instances, so that calculations are facilitated and comparisons readily made.

Detailed objects of the invention, particularly relating to circuit arrangements whereby the various necessary conditions may be readily attained to correspond with requirements and whereby a single meter may be used for various purposes without danger of damage thereto, will be apparent from the following description read in conjunction with the accompanying drawing, in which:

Fig. 1 shows a preferred form of wiring diagram of the apparatus;

Fig. 2 shows the arrangement of connections for measuring the voltage drop along a pipe line; and Fig. 3 shows the arrangement of connections for measuring the potential between a pipe line and a remote portion of the ground.

The apparatus, comprising the meter and associated circuits and a battery, which may be contained in a single case, is provided with three terminals 2, 4 and 6, designed to be connected to external circuits as will be indicated hereafter. The terminal 2 is connected to one blade of a double-pole, double-throw switch 8, the other blade of which is connected to the positive terminal of a multi-range voltmeter 10. This voltmeter is preferably of conventional type used for electrolysis measurements of the type indicated, being provided, for example, with ranges .01, .1, 1, 10, and 100 volts. Such meters are usually also provided with ammeter connections so that they may be conveniently used for current measurement. The present invention, however, is concerned only with the voltage ranges. For the measurements of the potential drops usually occurring along pipe lines in the cases indicated, the .01 and .1 volt ranges are generally used. Usually the 1 and 10 volt ranges of such meters are used in determining higher potential drops between ground points. In accordance with the present invention, however, only the 1 volt range is used for measurements heretofore using both the 1 and 10 volt ranges. The resistance of the meter for this range will be designated Ro. This resistance for the 1 volt range is generally of the order of several hundred ohms in meters of this type.

The negative terminal of the meter 10 is connected to one blade of a double-pole, double-throw switch 14, the other blade of which is connected to a terminal 16 of a Wheatstone bridge, the other three terminals of which are indicated at 18, 20 and 22. Between three pairs of the respective terminals are equal accurate resistances 24, 26 and 28 which, in a preferred embodiment of the invention, have values of one ohm each. The fourth arm of the bridge is provided by the resistance between the terminals 4 and 6 in series with a variable resistance 12 by reason of the connection of terminal 4 to terminal 18 of the bridge, and the connection of terminal 6 through a variable resistance 12, to the positive terminal of the meter and to one of the poles with which many contact the blade of switch 14, which is connected to terminal 16 of the bridge. The resistance 12 has a resistance range from 0 to the resistance of each resistance in the bridge, in the preferred embodiment this range being 0 to 1 ohm.

The terminal 4 is connected not only to the terminal 18 of the bridge, but also to one of the poles of the switch 14, as indicated. The opposite pole corresponding to the same blade is connected to terminal 20.

A battery 30, which may conveniently have a voltage of about 4.5 volts, has its terminals connected to the blades of a double-pole, double-throw switch 32 of push-button type, which normally makes contact with the two poles indicated to the left. The negative right-hand pole is connected through a current limiting resistance 34 to the terminal 18 of the bridge. The positive right-hand pole is connected directly to terminal 22 of the bridge.

A resistance network comprising two series arms 36 and 38 and a shunt arm 40 has terminals 42, 44 and 46. Besides the switches already mentioned, there are three additional switches 48, 50 and 52 connected to the other elements of the apparatus, as indicated in the drawing. Switches 48 and 52 are of push-button type. Both of these push-button switches normally make contact to the right, as indicated by the small arrows in the diagram.

In order to render the diagram more easily followed, the alternative positions of each of the switches have been designated by letters which correspond in the cases of the various switches, as indicated below. The various closed positions are also indicated in various types of broken lines.

In order to consider the use of the apparatus for the determination of potential drops along, for example, a pipe line, and possibly also the determination of a resistance of some particular section of that line, in case the line is not uniform, attention is directed to Fig. 2. In this figure, the pipe line is indicated at P and a joint at J. A non-welded joint of the type indicated constitutes an unknown resistance in the pipe line and consequently must be taken into account. The terminals 4 and 6 of the apparatus may be connected by leads of unknown resistance to stakes which make contact with the pipe line at spaced points indicated in Fig. 2 at 54 and 56. Metal to metal contact is produced without regard, however, to attainment of a definite contact resistance. The fact that metal to metal contact has been established is readily recognized by the reduction of the resistance of the external circuit to a value below one ohm. As will be obvious later, the pointed metallic stakes may be driven into the ground and manipulated to find and make such contact with the pipe line while the apparatus is in condition to give an indication of the external resistance. As soon as the resistance drops below one ohm, it may be assumed that a proper contact has been made. Because of the unknown resistance interposed by the joint, it is necessary to provide a second circuit in contact with the line at points 66 and 68 by the use of similar pointed stakes, which are preferably driven so as to make an oblique contact with the pipe surface, as are also the stakes at 54 and 56. The circuit connected between the contact points 66 and 68 involves, in series, a battery 58, an ammeter 60, a variable control resistance 62, and a key 64. The resistance 62 should be high compared to that of the pipe line between 66 and 68 so as not to change materially the current through the pipe line due to external sources.

With the key 64 initially open, adjustments are made to bring the total resistance external to the millivoltmeter to a fixed value $R_E$ which is conveniently one ohm. This end is attained by manipulations of the following type:

With the voltmeter on a low voltage range so that it may function as a galvanometer, the switches 8 and 14 are permanently closed in the $a$ positions and switch 32 is closed to its $a$ position by depressing its push-button. If the external reistance between the terminals 4 and 6 plus the value of resistance 12 in its initial condition of adjustment is not equal to $R_E$, namely, the resistance of an arm of the bridge, the depression of the push-button 32 will produce a deflection of the voltmeter which now acts as a galvanometer for the bridge. The resistance 12 is then adjusted until no deflection is produced by closure of switch 32 as compared with any deflection from zero it may have prior to closure of that switch in the $a$ position. When this condition is attained, it will be known that the resistance external to the meter has its fixed predetermined value $R_E$, which, as pointed out above, may be conveniently one ohm. It may be pointed out that any potential drop in any portion of the external circuit produced by current through the pipe line will produce an initial deflection of the meter which, however, will not be varied after the balanced condition is attained by manipulation of switch 32. Consequently lack of disturbance of the meter needle when switch 32 is depressed is indicative of balance.

After the total external resistance has been brought to the desired value, switch 14 is thrown to the $b$ position. Under such conditions it will be seen that the resistance 12 is in series with the meter 10 and the circuit external to the terminals 4 and 6. The switches must be of a type occasioning only a negligible resistance change in the circuit when manipulated. If $R_L$ is the resistance of the pipe line between the points 54 and 56, $R_M$ is the internal resistance of the meter for the particular range which is being used, $I_P$ is the pipe current in amperes, $V_{M1}$ is the reading of the meter 10 in volts, and $f_M$ is the scale correction factor of the meter, obtained by calibration, $R_E$ being the now known predetermined resistance of the circuit external to the meter, these quantities are connected by the relationship:

$$R_L I_P = \frac{(R_E + R_L + R_M)}{R_M} f_M V_{M1}$$

If some disturbing factor, such as the joint J, occurs between the contacts 54 and 56, the resistance $R_L$ will be unknown. This may be determined by considering, in conjunction with the relationship just given, a second relationship between the readings obtained by closure of switch 64. The resistance 62 is so adjusted as to limit the current $I_A$ passing through the ammeter 60 and measured thereby and if the contacts 66 and 68 are spaced suitable distances from contacts 54 and 56, the distances being more than five diameters of the pipe, it may be assumed that the added current $I_A$ is flowing uniformly through the pipe line and hence, the circuits being linear, its effect is additive to that of the pipe line current $I_P$. The relationship which will now hold is as follows:

$$R_L(I_A + I_P) = \frac{(R_E + R_L + R_M)}{R_M} f_M V_{M2}$$

the sign of $I_A$ being chosen in accordance with convention as to which direction of flow in the line is positive.

From the two equations just given, since $V_{M1}$, $V_{M2}$ and $I_A$ are obtained from the meter readings, and since $R_E$ and $R_M$ are known, both $R_L$ and $I_P$ may be determined. $R_L$ may be of minor or no interest, but $I_P$ will give the current flowing in the pipe line at the instant of making measurements within the short length between the points 54 and 56. As pointed out in the introduction, such currents may vary continuously and considerably, depending upon variations in conditions of current sources. However, since the key 64 may be but momentarily closed and then immediately opened, it can be readily seen whether or not the reading of meter 10 comes back to its initial value $V_{M1}$, indicating that during the moment the reading was made $I_P$ remained constant so that the above equations would be valid. It may be noted that, in general, such readings to determine current values in various portions of a pipe line are made simultaneously by different observers at spaced positions along the line, their measurements being suitably synchronized by direct or wireless connection of some type. In the case of a uniform pipe line with welded joints, the resistance $R_L$ is not an unknown quantity if the distance between the points 54 and 56 is known. Consequently there is no need for the circuit including the battery 58. In such cases, furthermore, the determination of results may be very much simplified, since the reading of the meter 10 in millivolts may be made to correspond to the current $I_P$ in amperes. This will be obvious by considering the expression:

$$I_P = \frac{(R_E + R_L + R_M)}{R_L R_M} f_M V_{M1}$$

If $R_L$ necessary to make $$\frac{(R_E + R_L + R_M)}{R_L R_M} f_M = 1000$$

is determined, the required distance between 54 and 56 may be calculated to achieve the result that the reading of meter 10 in millivolts will correspond to the current $I_P$ in amperes. Direct reading is thus made possible.

It may be pointed out that, in general, where good joints, such as welded ones, occur, the resistance $R_L$ will be negligible as compared with $R_E$ and $R_M$ so that the last expression given above may, for all practical purposes, be considered:

$$I_P = \frac{(R_E + R_M)}{R_L R_M} f_M V_{M1}$$

In order to avoid changing between the 1 and 10 volt ranges of the voltmeter 10 when measurements of large potential drops are being made, and also to provide a constant input resistance throughout voltage readings through the entire range 0 to 10 volts although accuracy is being maintained by reading either 1 or 10 volts on the full scale, the network indicated above is provided to be alternatively cut into or out of the input circuit of the voltmeter, depending upon the voltage which is to be read. In order to secure the constant input resistance and also the proper attenuation, the network must be properly designed as follows:

Calling the resistance of each of the series arms 36 and 38, $R_s$, the resistance of the shunt arm 40, $R_p$, and the desired attenuation N, then to secure the desired results of having the input resistance equal to the resistance $R_o$ of the one volt range of the meter and the desired attenuation, $R_s$ and $R_p$ should have values as follows:

$$R_s = R_o \frac{(N-1)}{(N+1)}$$

$$R_p = R_o \frac{(2N)}{(N^2-1)}$$

The type of measurement involved in the second use of the apparatus will be apparent from a consideration of Fig. 3. In this second use of the apparatus, the terminal 6 is unconnected, while terminals 2 and 4 are respectively connected either to two points on the ground by means, for example, of non-polarizing electrodes, or to one point on the ground and to a pipe line. In the latter case a steel stake may be used as a ground electrode as well as to contact with the pipe line since such stake is electrochemically closely related to the line. In Fig. 3 the terminal 2 is shown as connected to an electrode 70, while the terminal 4 is connected at 72 to the pipe line P.

Since it is experimentally found that such setup is of a linear nature, and since flow steady over the limited time of making a measurement is being considered, the portion of the ground circuit between the electrodes through which a sheet current $I_G$ is flowing is merely equivalent to a fixed resistance in series with a source of potential connected between the electrodes. What is of interest is the potential between the electrodes under open circuit conditions, i. e. when no current is taken by a measuring instrument, which potential would be that indicated by a null reading potentiometer. Since the measuring circuit here used does take current, such steps must be taken as would be in determining the value of the potential of the fictitious source in the equivalent circuit mentioned above. Linearity permits a superposition of potentials in the circuit and the method here used involves superposition and comparison of meter readings with and without an inserted known potential.

When the apparatus is used for determinations of this nature, the switches 8, 14 and 50 are thrown to the b positions. Push button switches 32 and 52 are normally in the b positions and when measurements are made the push-button 48 is either permitted to remain in its normal b position or, alternatively, is depressed to its c position.

Assuming the push-button 48 in b position, the circuit from the terminal 2 may be traced through one side of switch 8, both sides of switch 48 and one side of each of switches 50 and 52 to the terminal 42 of the network, the return circuit being from terminal 44 of the network through terminal 18 to terminal 4. It will thus be seen that the external circuit is placed across the input side of the network. The output side of the network is across the meter and the circuit may be followed from terminal 46 through one side of each of switches 50 and 8 to the meter and thence through one side of switch 14 and terminal 18 to terminal 44 of the network. Accordingly, with the parts in the position just indicated, the meter will indicate the potential drop through the earth between the electrode 70 and pipe P less the drop through the resistance $R_o$ of the meter and the external resistance including the equivalent resistance of the earth. With the network in the circuit just indicated, the needle of the meter must be read in conjunction with the 10 volt scale even though the 1 volt range of the meter is being used. If the reading thus indicated is less than 1 volt, it is only necessary to throw the switch 50 from its b position to its c position, whereupon the network is cut out of the circuit and the needle of the meter may then be read in conjunction with the 1 volt scale. At the same time, however, the input resistance to the meter circuit is still $R_o$ and comparable results may be readily attained without excessive calculations taking into account the different input resistances for different scales of the meter. Potentials less than 0.1 volt are not significant.

The actual potential drop is, of course, not known until the resistance of the circuit is known because of the fact that the meter and/or network are drawing current which flows through the entire circuit, including the ground and connections. Consequently, provision is made for inserting the battery 30 into the circuit to produce a superimposed potential drop the effects of which may be noted. Superposition is possible, since, as noted above, the whole system is, for practical purposes, linear.

The total resistance of the entire circuit is $$R_o + R_c$$

where $R_c$ includes the contact and lead resistances and the equivalent resistance of the earth between the electrodes. If $V_{M1}$ and $E_G$ are, respectively, the reading of the meter 10 and the open circuit potential drop through the ground, and $f_M$ is the correction factor mentioned above, then:

$$f_M V_{M1} \left\{ 1 + \frac{R_c}{R_o} \right\} = E_G$$

If, now, the battery is included in the circuit, while the potential $E_G$ remains the same, by depression of push-button 48 to the c position, then assuming the battery resistance negligible and representing its terminal voltage as $E_B$ and the new voltage reading of the instrument 10 with the battery inserted as $V_{M2}$, it follows that:

$$\frac{E_B}{V_{M2}-V_{M1}}=f_M\left\{1+\frac{R_c}{R_o}\right\}$$

Therefore the ratio $$\frac{E_B}{V_{M2}-V_{M1}}$$

is the factor by which any reading of the meter must be multiplied to get the open circuit potential drop desired for any subsequent time, so long as the set-up of apparatus remains the same.

Since $E_B$ appears in the above expression, it is necessary to make a check on the battery voltage to determine its true amount. This is effected simply by depressing push-button 52 to the d position, whereupon, with the switch 50 in the b position, the battery is placed across the network, which is now across the input of the meter so that the voltage of the battery may be read directly.

In the matter of making the battery test, it is necessary that the battery should not be placed directly across the meter when the 1 volt scale is being used, since otherwise damage may ensue. The wiring arrangement disclosed herein is of such nature that the battery cannot be accidentally placed across the meter when the network is not acting as a safeguard.

In order to secure the desired ultimate information as to the causes of electrolysis and for the purpose of making corrections to avoid damaging electrolysis, it is desirable to make simultaneous readings at different places at the same time as, for example, of the current in the pipe at two or more widely separated points on the pipe and/or simultaneous readings correlating the current in the pipe with the potential of the earth or some structure, in other words, carrying on various measurements of the types indicated in Figs. 2 and 3 simultaneously at different localities. For example, if, in such a correlation of measurements, it is found that the potential in the earth increases at the same time the line current increases and vice versa, the interpretation is that the line is gathering current at the point where the readings are being made and that the circuit for this current is completed in a positive direction along the pipe. Various combinations depending on conditions can be made. Simultaneous readings of current in the pipe at different points will give the amount of the line current being lost or gained in the interval between readings. By correlating the current in the pipe at some point with various disturbing factors, deductions can be made regarding the source of current in the vicinity. The making of simultaneous readings at different observation stations can be controlled by visual, sound or radio signals.

It is to be noted that the variations in readings are of more importance than the absolute values of the readings in determining the source of undesired currents. The absolute values of the readings involve some unknowns. For example, the potential taken with an iron stake in a set-up such as illustrated in Fig. 3 will be a combination of electrochemical potentials between the stake and the ground, the pipe and the ground, and the RI drop in the ground between the two electrodes. The electrochemical potentials are substantially constant and do not affect the determination of the variations. The variations may be correlated in time with time variable sources as, for example, electric railways, power house loads, etc. If, for example, it is found that the currents vary as power is variably consumed by a car in the vicinity, it will be deduced that the railway may be responsible.

The fact that there is generally a continuous variation presents the problem which the present invention solves of securing readings of a substantial instantaneous nature from the standpoint of the relatively slow variations which generally occur. There was pointed out in connection with the type of determination made in accordance with Fig. 2 the fact that conditions could be changed over instantaneously to make corresponding readings in such fashion that a check as to the constancy of conditions during the making of a succession of steps of the same observation could be readily secured. The same is true in carrying out the calibrating steps in connection with the arrangement of Fig. 3. As indicated above, the calibration by the insertion of the battery must be carried out while the ground potential remains the same. A check of the constancy of the ground potential before and after the insertion of the battery may be readily made by manipulation of push-button 48. When the button is in released condition before and after insertion of the battery, the meter reading should be the same. Checks of calibration should, of course, be made at various times.

It will be obvious that various changes may be made without departing from the invention as defined in the following claims.

What I claim and desire to protect by Letters Patent is:

1. The method of measuring current flowing in a portion of a low resistance conductor such as a buried pipe line, or the like, by the use of a meter of known resistance adapted to be connected across said portion by leads making contacts with the conductor, including adjusting the external circuit of the meter, including the leads, said portion of the conductor, and contacts, to attain a predetermined resistance thereof, connecting the meter to take current through the leads following such adjustment, and, while the meter is so connected, varying the current through said portion of the conductor by a known amount.

2. The method of measuring a potential drop between two points of an extended conductor, such as a portion of the earth, through which current is flowing, by the use of a low range meter of known resistance adapted to be connected between said points by leads making contacts with the conductor at said points, including successively causing said meter to give indications without and with a known potential in the meter circuit, and, if either of such indications exceeds the range of the meter, inserting, for the purpose of getting that indication, between the meter and the external circuit, a network producing a known attenuation and providing an input resistance equal to that of the meter.

3. The method of measuring a potential drop between two points of an extended conductor, such as a portion of the earth, through which current is flowing, by the use of a low range meter of known resistance adapted to be connected between said points by leads making contacts with the conductor at said points, including successively causing said meter to give indications without and with a source of potential in the meter circuit, and, if either of such indications exceeds the range of the meter, inserting, for the purpose of getting that indication, between the meter and the external circuit, a network producing a known attenuation and providing an input resistance equal to that of the meter, and determining the potential of said source by placing it across said network when the network is operatively connected to the meter.

4. The method of measuring potential drops between two points of an extended conductor, such as a portion of the earth, through which current is flowing, by the use of a low range meter of known resistance adapted to be connected between said points by leads making contacts with the conductor at said points, including causing said meter to give successive indications, and if any of such indications exceed the range of the meter, inserting for the purpose of getting that indication, between the meter and the external circuit, a network producing a known attenuation and providing an input resistance equal to that of the meter.

5. In combination with a pair of terminals adapted to be connected by leads to a current carrying conductor, a meter, a variable resistance, a bridge for indicating the attainment of a predetermined value for the sum of the external resistance between the terminals and the variable resistance upon adjustment of the latter, and means for connecting the variable resistance in its adjusted condition in series with the meter across the terminals.

6. In combination with a pair of terminals adapted to be connected by leads to a current carrying conductor, a meter, a variable resistance, a bridge for indicating the attainment of a predetermined value for the sum of the external resistance upon adjustment of the latter, said meter being arranged to function as a galvanometer for said bridge, and means for connecting the variable resistance in its adjusted condition in series with the meter across the terminals.

7. In combination with a pair of terminals adapted to be connected by leads to a current carrying conductor, a variable resistance connected at one side to one of said terminals, a meter one side of which is continuously connected to the other side of the variable resistance, switch means arranged, when in one position, to connect the other side of the meter to the second of said terminals, three fixed resistances forming three arms of a Wheatstone bridge, and means for supplying current to the bridge, said switch means being arranged, when in an alternate position, to arrange the external resistance between the terminals and the variable resistance in series as the fourth arm of the bridge, and to arrange the meter to function as the bridge galvanometer.

8. In combination with a pair of terminals adapted to be connected by leads to a current carrying conductor, a low range meter of known resistance, a network, means for alternatively connecting the meter across the terminals with the network disconnected or the network across the terminals with the meter across the output terminals of the network, said network having an input resistance when connected to the meter equal to the meter resistance and arranged to produce a predetermined attenuation, and means for inserting a source of potential in the input circuit of the network in series with the external circuit.

9. In combination with a pair of terminals adapted to be connected by leads to a current carrying conductor, a low range meter of known resistance, a network, means for alternatively connecting the meter across the terminals or the network across the terminals with the meter across the output terminals of the network, said network having an input resistance when connected to the meter equal to the meter resistance and arranged to produce a predetermined attenuation, means for inserting a source of potential in the input circuit of the network in series with the external circuit, and means for placing said source of potential across the input side of the network.

10. In combination with a pair of terminals adapted to be connected by leads to a current carrying conductor, a low range meter of known resistance, a network, means for alternatively connecting the meter across the terminals or the network across the terminals with the meter across the output terminals of the network, said network having an input resistance when connected to the meter equal to the resistance between the terminals when the meter is connected across the terminals, said network being arranged to produce a predetermined attenuation, and means for inserting a source of potential in the input circuit of the network in series with the external circuit.

11. The method of measuring current flowing in a portion of a low resistance conductor buried in the ground, such as a buried pipe line, or the like, by the use of a meter of known resistance including introducing leads from said meter into the ground into contact with the ends of said portion thereby making contacts of unknown resistance between the leads and the conductor, adjusting the external circuit of the meter, including, in series, the leads, said portion of the conductor, and contacts, to attain a predetermined resistance thereof, and connecting the meter to take current through the leads following such adjustment.

12. The method of measuring current flowing in a portion of a low resistance conductor buried in the ground, such as a buried pipe line, or the like, by the use of a meter of known resistance including introducing leads from said meter into the ground into contact with the ends of said portion thereby making contacts of unknown resistance between the leads and the conductor, adjusting the external circuit of the meter, including, in series, the leads, said portion of the conductor, and contacts, to attain a predetermined resistance thereof of the order of one ohm, and connecting the meter to take current through the leads following such adjustment.

JOHN M. PEARSON.